United States Patent [19]

Thwaites et al.

[11] 4,340,441

[45] Jul. 20, 1982

[54] SLICING WEB MATERIAL

[75] Inventors: Peter J. Thwaites, Eltisley; John N. Thornton, Abbotsley, both of England

[73] Assignee: DuFaylite Developments Limited, England

[21] Appl. No.: 101,408

[22] Filed: Dec. 10, 1979

Related U.S. Application Data

[63] Continuation-in-part of Ser. No. 851,907, Nov. 16, 1977, Pat. No. 4,187,138.

[51] Int. Cl.[3] .......... B32B 31/00

[52] U.S. Cl. .......... 156/512; 83/96; 83/261; 83/262; 83/282; 83/452; 83/488; 156/548

[58] Field of Search .......... 156/197, 264, 512, 578, 156/548; 83/94, 96, 261, 262, 282, 452, 488

[56] References Cited

U.S. PATENT DOCUMENTS

| | | | |
|---|---|---|---|
| 2,940,504 | 6/1960 | Jacquet | 156/512 X |
| 3,413,177 | 11/1968 | Hoyt | 156/548 X |
| 3,416,903 | 12/1968 | Steele | 156/548 X |
| 4,187,138 | 2/1980 | Thwaites et al. | 156/512 |

*Primary Examiner*—David A. Simmons
*Attorney, Agent, or Firm*—William A. Drucker

[57] ABSTRACT

Apparatus for cutting web material transversely to form sections has an arrangement for advancing the material a section at a time across a linear cutting edge. A linear guide parallel with the edge carries a circular blade which overlaps the linear cutting edge said blade being reciprocably driven along a linear guide. Each forward, and each reverse, cutting-stroke of the circular blade cuts off the then advanced section. The advancing arrangement is timed to operate between the ends of the forward strokes and the beginnings of the reverse strokes of the circular blade and vice versa. A preliminary advancing arrangement is provided for advancing a measured amount of web material to form slack which is taken-up by advancement of the material across the linear cutting edge. Structural honeycomb material may be produced by using two layers of material laminated together by bands of adhesive, and bearing other bands which are exposed, and arranging pressing devices which follow the circular blade and press the sections into a receiving throat. The pressing action displaces the cut sections to give a honeycomb material with the odd and even pairs of layers in different registries.

10 Claims, 10 Drawing Figures

SLICING WEB MATERIAL

This application is a continuation-in-part and division of our Application Ser. No. 851,907, filed Nov. 16, 1977, now U.S. Pat. No. 4,187,138 and relates to structural honeycomb materials formed from sheet material.

Structural honeycomb material, described in British Patent Specification No. 591,772 and elsewhere is formed in the unexpanded state from sheet material, originally manufactured in the form of a continuous web, and consists of cut strips of the sheet material adhesively secured together. A standard practice has been to form the honeycomb material in two stages. In the first of these stages, layers of the sheet material are secured together by the adhesive to form a block which is sliced, in the second stage, to yield the material in the thickness required. This slicing is normally performed by a guillotine which cuts repeatedly through the layers of the block and divides them into strips, secured together by the adhesive, whose widths are constant in any slice and are equal to the required thickness.

Each stroke of the guillotine slices through the entire thickness of the block to form a substantial number of cut edges. A good rate of output is achieved, but there is the disadvantage that an unusable end portion of the block remains at the end of the slicing operation and must be discarded. It is attractive to cut the sheet material directly from the continuous web to form strips of the final required width (which determines the thickness of the honeycomb) and assemble the strips to form unexpanded honeycomb material so that virtually all of the web is formed into useful product.

An object of the present invention is to provide structural honeycomb material in a novel and advantageous form.

Another object is to provide an apparatus for cutting web material transversely to form sections of equal width by a travelling rotary blade in association with a fixed blade having a linear cutting edge, in which apparatus the web material is advanced and clamped for the cutting step by final advancing and clamping means, and primary advancing and clamping means advances the web material and clamps it whilst the final clamping means is clamping it. By having the rate of advancement by the primary advancing means less than that by the final advancing means, the delivery of each section of the material for cutting is accurately accomplished at a high speed whilst the rotary blade is being reversed. Further, the advancement and clamping of a metered portion of the material by the primary means is achieved during the cutting of the preceding portion, ie. over a relatively long period, making possible an accuracy of metering which could not be achieved during the short reversal periods. The final advancement is akin to a rapid snatching action.

Another object is to provide a honeycomb material in which the constituent strips are arranged in the form of a series of groups of strips of n strips each (n for example being 2) and having the even groups of the series regularly displaced in the direction of the longitudinal cut edges, relative to the odd groups of the series.

Still another object is to provide apparatus for cutting web material to provide pieces of consistent dimensions (in the longitudinal direction of the web material) in a rapid yet accurate manner. The pieces so cut can be separate or, by providing the apparatus with adhesive band applicators, can be joined together as they are cut to yield honeycomb material as the product.

In order to prevent adhesion of the said cut edge to the linear cutting edge, as may occur with some web materials, means may be provided for displacing said cut edge from the linear cutting edge across the direction of advancement of the web material before there has been substantial advancement of the web material after the transverse cutting.

The apparatus of the invention may be provided with a throat for locating the transversely cut sections in face to face relationship with their cut edges registered and a pressing device movable with the mounting to follow the blade with the circular peripheral cutting edge for pressing upon each projecting section of the web as the section is being cut so that the cut portion of each section is progressively pressed along its length into the outlet whilst the cutting of said section proceeds.

In a preferred arrangement, the mounting carries a pair of said pressing devices each of which is movable between an operative position and a withdrawn position so that one pressing device follows the blade across the web material as the mounting is moved in the other direction. For mechanical simplicity, the pressing devices may be movable by a mechanism reversible adjacent to the reversal positions of the mounting by engagement with fixed parts of the apparatus. A suitable reversing mechanism is a slide carried by the mounting and having a pair of cam-formations, one for each pressing device.

The web material employed is usually a cellulosic material, eg. paper or thin cardboard produced from wood fibre in virgin or recycled form. In practice kraft paper or the grade of cardboard produced from waste paper and known as chip-board, familiar for its use in the production of cartons for breakfast cereals, are preferred.

In practice, the honeycomb material is economically produced from continuous web material without the cutting losses associated with forming blocks of material and cutting it to width as described in British Specification No. 591,772. Moreover, the width of the strips may be arranged to change progressively with a consequential progressive change of the thickness of the material as measured between the faces defined by the cut edges of the strips. This change is readily accomplished using apparatus described herein. Whilst the change may be effected for the purpose of producing a product of non-constant thickness, its main application is in changing-over from one product thickness to another during a production run. In the latter case the material of changing thickness is wasted but the change-over is obtained without stopping the run.

Manufacture is usually from two webs but any convenient even number n of webs may be employed. Each cut strip is a composite strip formed of n plies secured in face-to-face relationship by the adhesive.

In the production of the honeycomb material using a travelling blade followed by a pressing device (90 and 91 in the drawings hereinafter referred to) which presses the cut strips forward for progressive compaction into honeycomb material, the forward pressing causes the first-cut ends of the composite strips to be displaced in the direction in which the blade is travelling and this displacement is continued throughout the length. In the result, the ends of the strips produced by cutting in the one direction are displaced relative to the ends produced by cutting in the other direction. Accordingly this invention provides a novel structural honeycomb material constituted by a series of groups of n strips each and having the even groups of the series regularly displaced, in the direction of the longitudinal cut edges, relative to the odd groups of the series.

The regular displacement of the groups, visible in the unexpanded material at the edges, is accompanied by a similar regular displacement of the positions of the adhesive in the product. This displacement of the adhesive affects the geometry of the material when it is expanded to the hexagonal open cellular stage. It is a regular effect which neither produces an irregular pattern in the material nor adversely affects its utility. It has an indirect value in that it leads to economic advantages.

As will be understood, the effect is found in portions of the material cut from parts thereof remote from the edges.

The invention includes within its scope structures in the form of a structural honeycomb material laminated in the expanded state between a pair of facing panels, the structural honeycomb material being a material showing the said regular effect or a portion of such a material.

The following description of a preferred embodiment of an apparatus according to the invention, provided in a form for the production of structural honeycomb material, in which description reference is made to the accompanying drawings is given in order to illustrate the invention. In the drawings.

Figure 4:
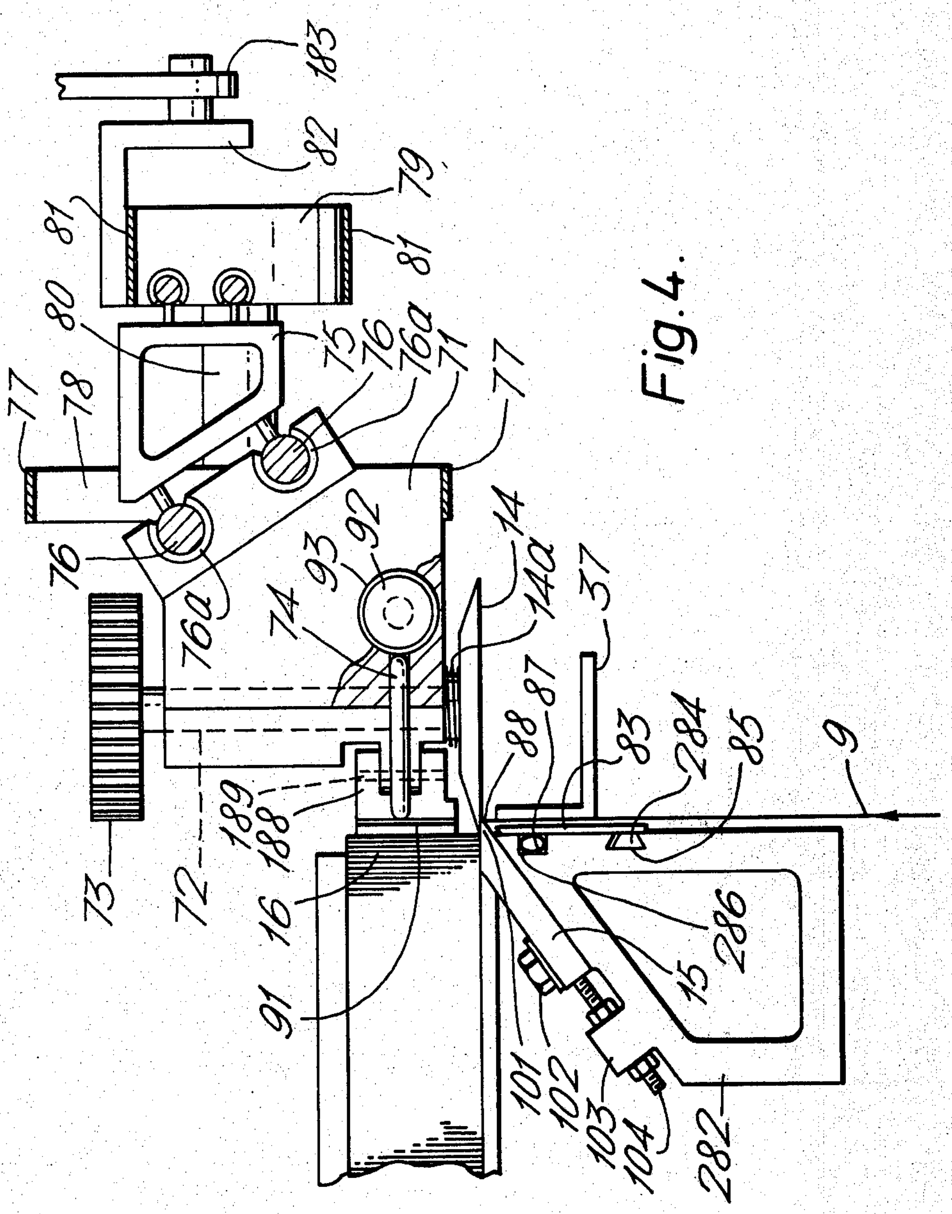
Figure 5:
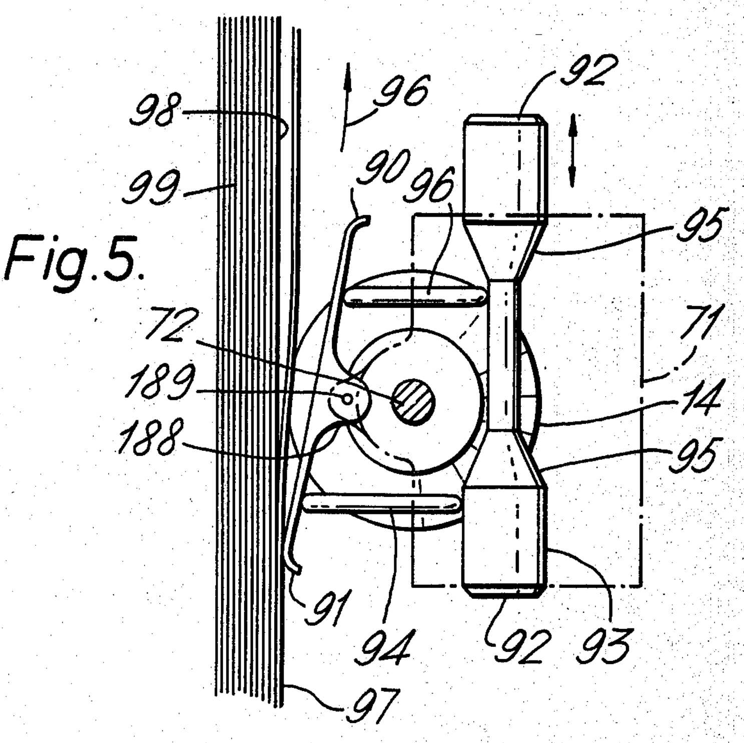
Figure 6:
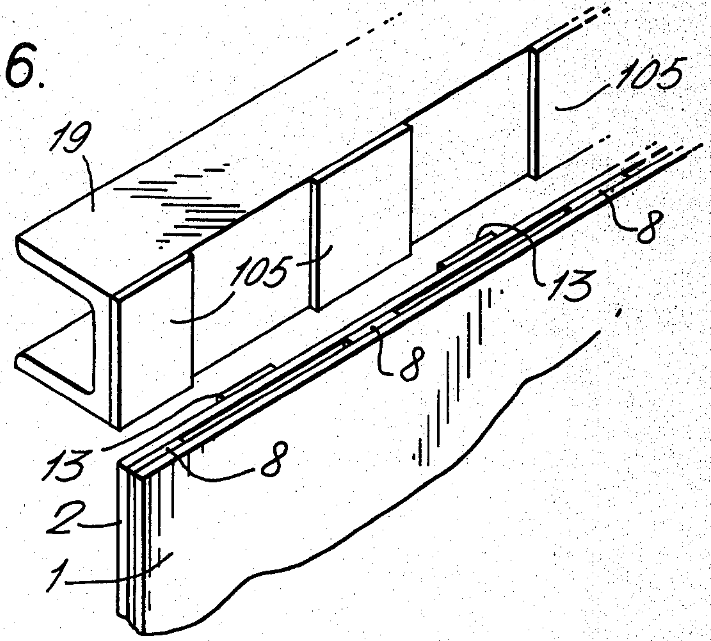
Figure 7:
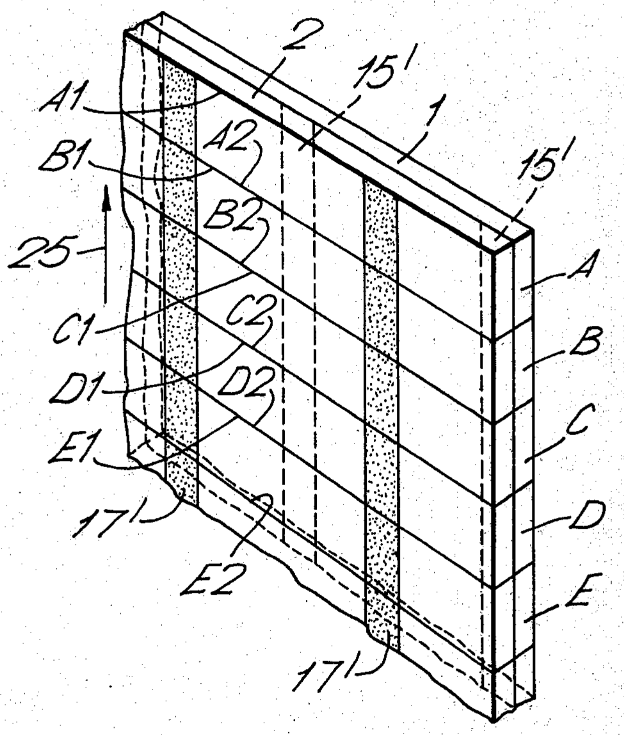
Figure 8:
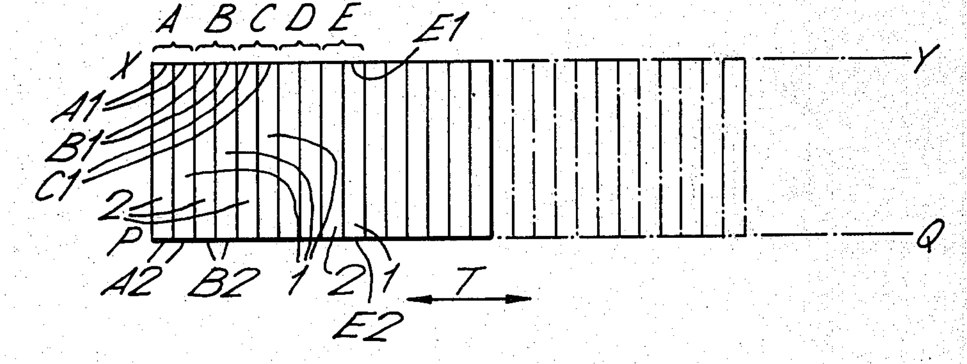
Figure 9:
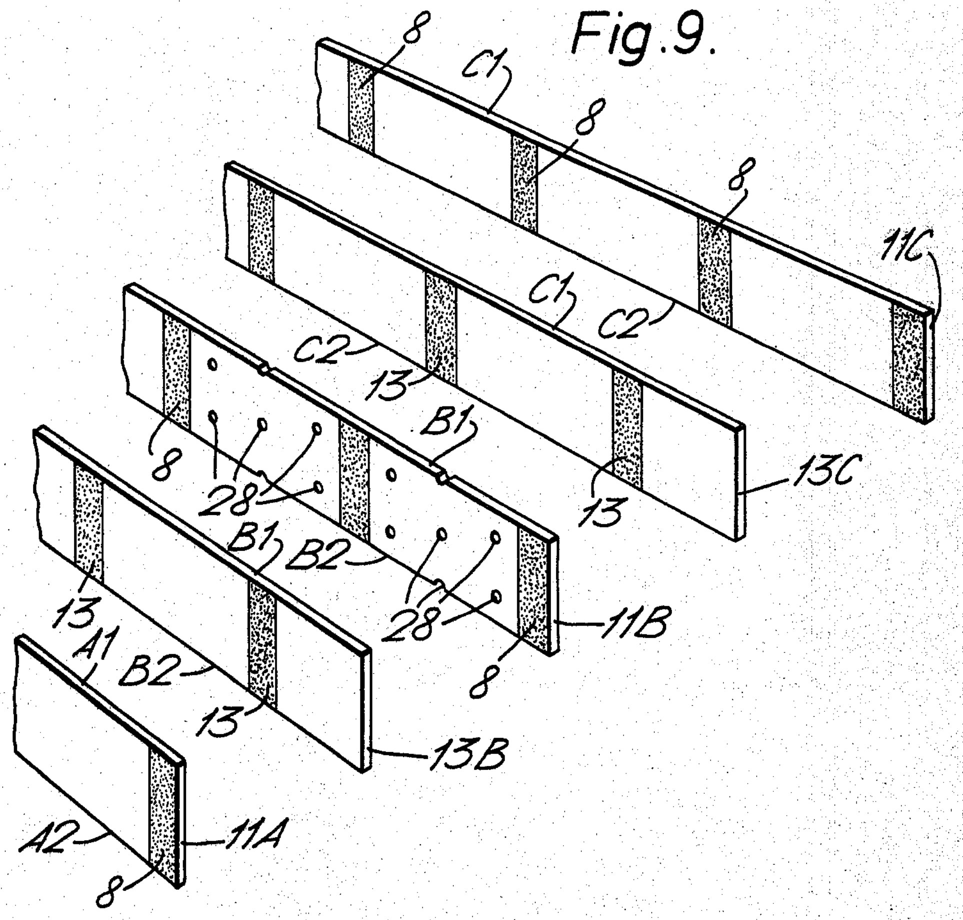
Figure 10:
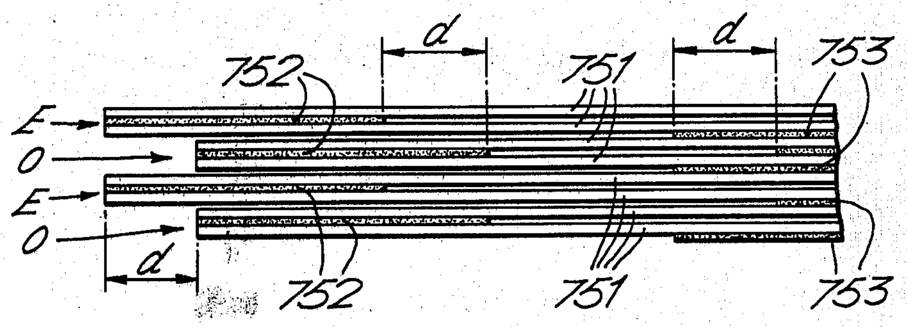

FIGS. 4 and 5 are cross sections showing parts of the second section in further detail, the said mounting being shown in FIG. 4, FIG. 6 is a perspective showing part of the said second section on an enlarged scale for purposes of further explanation, FIGS. 7, 8 and 9 are diagrammatic drawings showing the web material and the positioning of strips cut therefrom on an enlarged scale, and FIG. 10 shows an edge part of the honeycomb material on an enlarged scale.

Figures 1, 2:
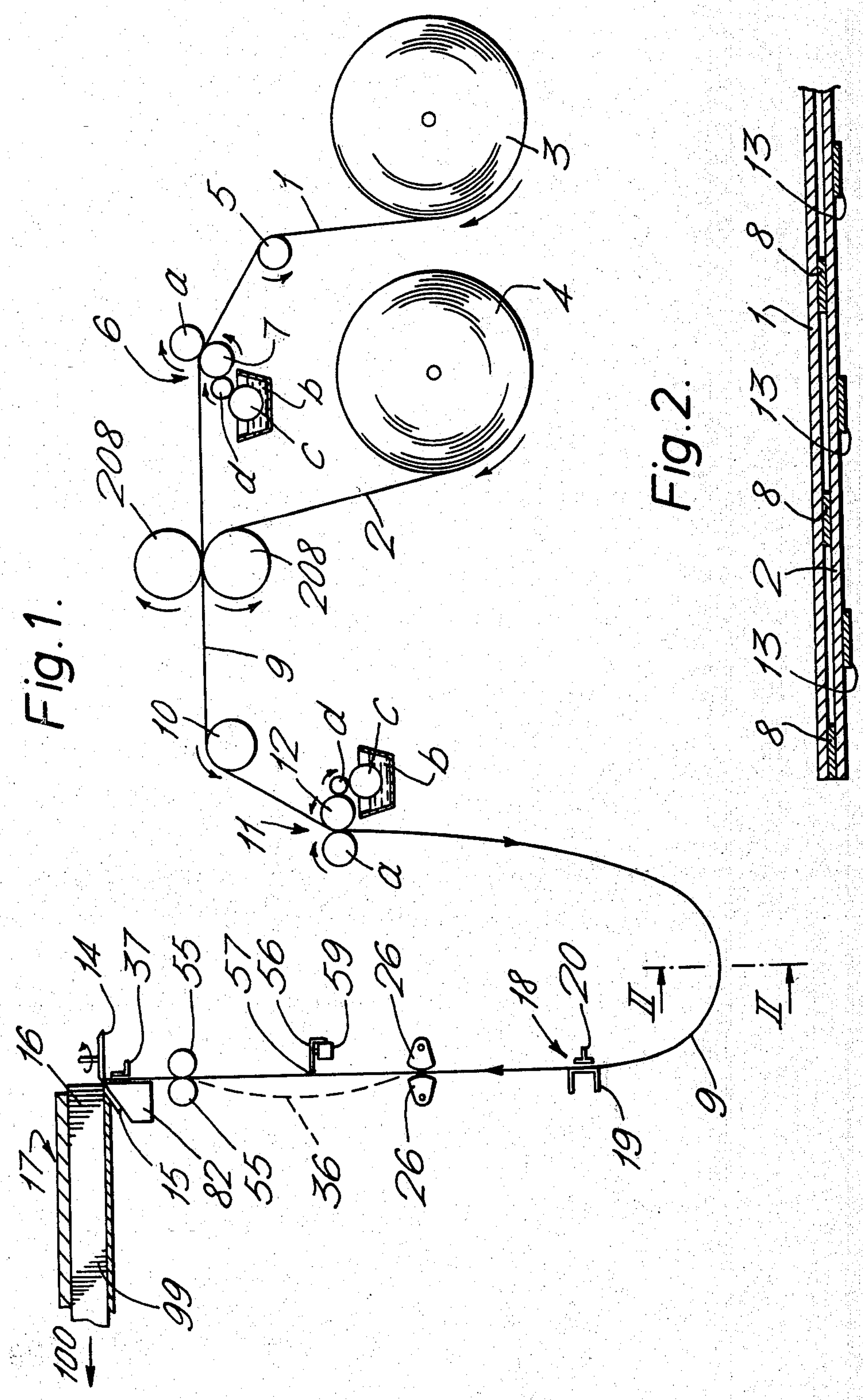
FIG. 1 is a diagrammatic drawing showing the general arrangement of the apparatus, which has a first section for producing adhesive-bearing two-ply web material and a second section for forming the web material into structural honeycomb material.
FIG. 2 is a cross-section, on an enlarged scale, taken along II—II of FIG. 1.

FIG. 1 shows webs 1 and 2 of kraft paper or other cellulosic material drawn from supply rolls 3 and 4. Web 1 passes over a guide roller 5 and through a roller-printing unit 6 to where a printing roller 7 applies to the web longitudinally extending bands, spaced apart, bands 8 of adhesive to one of its faces. Printing unit 6 is conventional. It has a backing roller a, a trough b containing adhesive, a pick-up roller c, and a transfer roller d. From printing unit 6 web 1 passes between pressure rollers 208 the adhesive-bearing face of web 1 is brought into contact with web 2 and subjected to pressure to form a two-ply material 9 which, after passage over a guide roller 10 passes through a second roller printing unit 11. Unit 11 is similar to unit 6. Parts a, b, c and d correspond with the similarly identified parts of unit 6. In printing unit 11, a printing roller 12 applies further longitudinally extending bands 13 of adhesive to one face of the two-ply material 9. As shown in FIG. 2, bands 13 are positioned to lie mid-way in the width dimensions of webs 1 and 2, between the bands 8.

The two-ply web material bearing bands of adhesive on an outer face is known in the art of honeycomb manufacture. Eventually, when the material is sliced by rotary blade 15 having a linear cutting edge, and the resulting two-ply sections are packed together at 16 in throat 17, the bands 13 join the slices together to form honeycomb material in the unexpanded stage, which material is expandable under tension to the expanded state in which it has an open hexagonal, cellular structure.

Beyond printing unit 11, the material passes to a primary clamp 18. It hangs loosely between these parts in the form of a catenary. This arrangement allows the printing rollers to operate continuously and the parts of the apparatus beyond them, including clamp 18 to act intermittently in the manner to be described. By providing devices to detect predetermined upper and lower limits for the lowest point of the catenary, eg., photocells, the continuous web movement elements of the machine can be automatically controlled to satisfy the demands of the intermittently-acting cutter.

Figure 3:
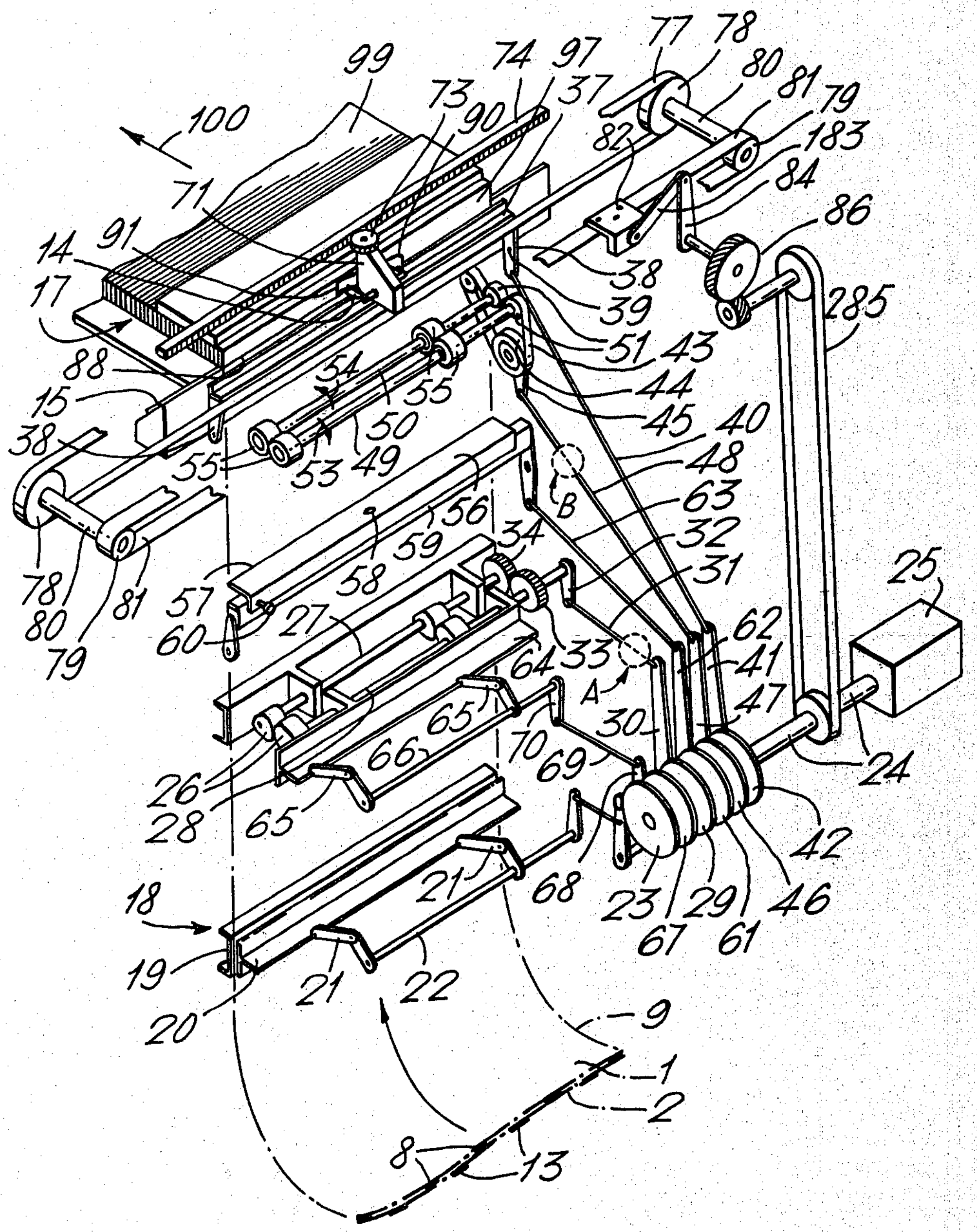
FIG. 3 is a perspective showing the arrangement of the principal parts of the said second section except the mounting for the carriage.

Primary clamp 18 and the parts of the apparatus which follow it, are shown in greater detail in FIG. 3 than in FIG. 1. Clamp 18 has a fixed backing part 19 and a part 20 movable into and out of the clamping state shown in FIG. 3 by articulated linking members 21 movable by a shaft 22 which is given an oscillatory rotational motion by the first cam 23 of a set of six cams carried by a continuously rotating shaft 24 driven by a main drive diagrammatically indicated at 25.

With clamp 18 out of its clamping stage, the web material is advanced between rubber gripping members 26 mounted for oscillatory rotation upon a pair of shafts 27 and 28. Members 26 are arranged as shown in pairs. Each pair has one member positioned to act upon one face of the web material and the other member positioned to act upon the other face thereof. The parts of the peripheral faces of the members 26 which contact the web material are cylindrical and co-axial with shafts 27 and 28. In FIG. 3, members 26 are shown in gripping relationship with the web material. To advance the material by a measured amount, shaft 28 is given a rotational movement by the third cam 29 on shaft 24 which acts via a cam-follower 30, and a link 31 acting upon a lever 32 keyed to shaft 28. Shaft 28 carries a pinion 33 which engages a similar pinion 34 to give an equal and opposite rotational movement. The advancement of the material by members 26, produces slack indicated by the broken line at 36 in FIG. 1.

During the advancement, the material is held clamped below blades 14 and 15 by a transverse bar 37 mounted on arms 38 pivotally mounted at 39 for movement into and out of its clamping position by a linkage 40 connected with a cam follow 41 driven by the sixth cam, 42, on shaft 24.

When rotary blade 14 is co-acting with blade 15 to cut a section from the web material, bar 37 holds the web material clamped. After a section has been cut, and blade 14 is beyond one or the other edge of the material bar 37 is moved from its clamping position. With clamp 18 in its closed state, a belt 43 is driven by a one-way drive 44 actuated by a lever 45 moved by a cam 46, on shaft 24, acting via a cam follower 47 and a linkage 48. The movement of belt 43 rotates shafts 49 and 50 via pulleys 51 and 52 in the opposite directions indicated by arrows 53 and 54, causing the rotation of secondary advancing members 55 having cylindrical peripheral surfaces in permanent engagement with the web material. The members 55 are of the slipping clutch type. They operate to take up the slack (FIG. 1) and thereby advance the cut edge of the laminated web material until the material is tight back as far as the primary clamp 19. The members 55 then slip with the web material taut. In this way the members 55, whose time for operation is restricted to within periods when the rotary blade 14 is clear of the web, produce an advancement of the material comparable in accuracy with the advancement produced in a longer period of time by members 26.

In practice, the edges of the laminated material delivered to the primary clamp 18 can vary relative to one another in length. To compensate for this variation, a cross-bar 56 having a web-engaging edge 57 is mounted for movement about a pivot 58 to a frame 59. An adjusting screw 60 enables the orientation of edge 57 to be set as required to tighten the web material across its width. Edge 57 is brought into engagement with the material (by a cam 61 on the shaft 24 operating via a cam follower 62 and a linkage 63) when the bar 37 is in the clamping position, primary clamp 18 is open and the members 26 are out of gripping relationship with the material. The action of edge 57 accordingly extends back to the material 9 hanging in the aforementioned catenary.

The gripping action of the members 26 is interrupted as required by moving shaft 28, and the two members thereon away from the web material. Shaft 28 is mounted upon a bar 64 which is moved to and fro by a pair of lever systems 65 connected with a shaft 66 rotatable by a cam 67 on shaft 24, a cam follower 68 and a linkage and lever, 69 and 70 respectively. The members 26 are re-positioned for their next advancement of the web material whilst shaft 28 is locating the two members thereon out of contact with the web material. This action is produced by the shape of the cam 29. Only a short movement of shaft 28 is required and pinions 33 and 34 are sufficiently deep-toothed to enable them to remain enmeshed when shaft 28 is moved.

A carriage 71 is fitted with a vertical spindle 72 (FIG. 4) to the bottom end of which is secured the rotary blade 14. At its upper end the spindle has keyed thereto a pinion 73 which engages a transversely extending rack 74. A transverse beam 75 of hollow cross section carries slides 76 with which carriage 71 is engaged by linear bearings **76*a* as shown in FIG. 4 for a to-and-fro movement in which it is driven by the lower lap of a belt 77 which passes round pulleys 78. These pulleys are mounted together with pulleys 79, whose diameters are one third of the diameters of pulleys 78, upon shafts 80. A belt 81 extending round pulleys 79 has, secured to its upper lap a clamp 82 which is connected by a link 183 with a crank 84 driven in continuous rotary motion by main drive 25 via a belt 285 and reduction gear 86**.

Because of the different diameters of pulleys 78 and 79, the to and fro motion of belt 81 produced by crank 83 is increased threefold so that the rotary blade 14 is driven across the whole width of the web material between the reversals of its linear motion.

As shown in FIG. 4, the web material 9, where it is pressed towards transverse holder 282 for blade 15 by clamping bar 37 is backed by a transverse metal strip 83. Strip 83 is located by formations 284 having a loose fit in a dovetail groove 85 formed in holder 282. Parallel with groove 85 is a further groove 286 in which is located rubber tubing 87. When bar 37 is retracted to permit the feeding of a section of the material over the cutting edge of blade 15, the rubber tubing expands to pivot the strip 83 in a clockwise direction, as viewed in FIG. 4, so that the cut edge 88 of the web material 9 is positively disengaged from blade 15. Adhesion of edge 88 to blade 15, which is to be anticipated at least occasionally with some grades of web material, would interfere with the feeding, over blade 15, of the next section to be cut.

Mounted upon carriage 71 over blade 14, is a member 188 pivotable at 189 (FIG. 5) and extending to provide an integrally formed pair of pressing devices 90 and 91. When the carriage 71 is reaching an end of its linear travel, one or other end 92 of a bar 93, slidably mounted on the carriage, engages a fixed stop (not shown) provided on the apparatus and is therefore moved axially relative to the carriage. The movement causes the ends of a pair of plungers 94 (spring-loaded by means not shown) to ride over cam surfaces 95 formed on bar 92. The distal ends of plunger 94 are thereby caused to move in opposite directions and pivot member 188 so that one or other of pressing devices 90 or 91 is swung into its operating position. When the carriage 71 is carrying blade 14 in a cutting movement in the direction of arrow 96, pressing device 90 is retracted and pressing device 91 follows the blade to press the section 97 of the material being cut past the cutting edge of blade 15 and pack it against the previously cut section 98. The effect is to press the sections, during their cutting, in turn into the throat 17 (FIG. 1) so that they are adhered together by the bands of adhesive 13 (FIGS. 1, 2 and 3) to form honeycomb material 99 in the unexpanded state.

The honeycomb material thus produced is drawn away in the direction of arrow 100 (FIGS. 1 and 3) for storage (eg. in lapped form in a stillage) or immediate use eg. involving its expansion in the direction of arrow 100 to the open cellular stage and lamination between facing materials in the manufacture of doors or other building panels.

The cutting system of the apparatus is capable of producing honeycomb material of which the constituent strips have a width, edge characteristics and edge parallelism which are commercially satisfactory. These requirements have been difficult to achieve heretofore in the production of material directly in the thickness required, at an economic rate.

Referring to FIG. 4, blade 15 is secured to mounting 82, at intervals along its length, by bolts 102 tightened to a limited torque and passing through oversized holes in the blade. Mounting 82 has along its length a series of lugs 103 through which pass screws 104. Because blade 15 is inclined as shown, its edge 101 is adjustable (in a direction having a vertical component) by bolts 104 to yield or restore a closely cooperating relationship along its length with blade 14. The straightness of cutting is determined by the linearity of the slides 76.

As will be understood from FIGS. 1, 2 and 3 the two ply web used in the manufacture of honeycomb material has bands of adhesive 13 exposed on one face. To avoid disturbing these bands, those parts of the apparatus which contact this face (19, 26, 55 and 83) are, in practice, relieved at the positions of the bands 13. This is readily achieved. By way of example, part of backing part 19 is shown in FIG. 6. Here relief is provided by adhesively securing rubber pads 105 to contact the material between the adhesive bands.

Honeycomb material is required in a range of thickness. The thickness obtained with the apparatus shown depends upon the amount by which the edge of the material is advanced by members 26 and 55. It may be made variable by interposing adjustment devices in linkages 31 and 48 as indicated diagrammatically at A and B in FIG. 3. Such devices may take the form of incrementally or continuously adjustable-fulcrum levers. More complex lever arrangements giving the required effect are widely understood in the mechanical art. The preferred lever arrangement incorporates a tandon kinetic four bar chain which gives a high velocity ratio when required and is adjustable whilst the apparatus is running. The latter property is especially advantageous when setting-up the machine to produce honeycomb material of a newly required thickness.

The cutting edge 101 of the blade 15, is constituted by the intersection of two surfaces. Sharpening of blade 15 is performed by grinding the generally planar upper surface. In the operation of the apparatus, the rotary blade 14 laps this surface inwardly from the cutting edge and the two blades have a mutual honing action. The straightness of the cut depends primarily upon the straightness of beam 75. Any departure from true straightness of cut occurs at both edges of the strips. It has virtually no effect upon their constancy of width and its effect upon the flatness of the honeycomb material produced tends to be insignificant because of the flexibility of the material in its expanded form.

The apparatus gives good precision cutting at a commercially satisfactory speed. Co-action between straight and rotary blades is readily achieved and maintained over a long cutting length. Indeed the cutting length may be made long enough to permit the use of web material of double width. The usual commercial requirement is for honeycomb of width about 3 feet. Used with 6-foot webs, the apparatus can be run at a cutting rate per minute of the same order as for 3 foot webs and the product cut into two 3 foot products. This is because the number of reversals of the blade 14 for a given quantity of honeycomb product is halved and reversals occupy a substantial proportion of the operating cycle.

The pressing devices, 90, 91 (FIG. 5) press the two-ply strips, as they are being cut by travelling blade 14 into the throat 17 (FIG. 1) to consolidate them to form the honeycomb material 99 being produced. As a cut begins, the first-severed portion is deflected forwards by device 90 or 91 but it remains joined to the web material. For geometrical reasons, curvature produced by the deflection causes the free end of the strip to be displaced in the direction of travel of blade 14. This displacement continues uniformly as the cut is made so that the whole strip is displaced. In the result, the odd-number two-ply strips are displaced in one direction and the even numbered ones in the opposite direction. This gives the edges of the honeycomb product a castellated appearance as shown in FIG. 10. In FIG. 10 the thickness of the glue bands 752 and 753 is grossly exaggerated. The thickness is not immediately discernible to the naked eye, part of the glue is of course usually absorbed by the sheet material, and all the constituent strips of sheet material appear to be in face-to-face contact.

The curvature which results in the displacement is shown at an intermediate stage of the cutting in FIG. 5—note the widening gap between sections 97 and 98.

In FIGS. 7 to 9, the thicknesses of the web material and the strips cut therefrom are shown grossly and inconsistently exaggerated for clarity of illustration. The positions of the adhesive are indicated but without showing its thickness.

FIG. 7 shows the two-ply material which has been cut by the blade system 14,15 to form the two-ply material 1, 2 with a first cut edge A1. The next traverse of the rotary blade 14 cuts-off a two-ply strip A, simultaneously forming a second cut edge A2 and a first cut edge B1 for the next strip B. Strip B will be cut-off by a traverse which forms a second cut edge B2 for strip B and a first cut edge C1 for strip C. This cycle is continued indefinitely.

FIG. 8 is a side elevation of the unexpanded honeycomb material, as seen from the same direction as in FIG. 7 and shows the disposal therein of two-ply strips A to E and the cut edges produced in pairs as aforesaid. One member of each pair contributes to the generally planar top surface XY of the material and the other to the generally planar bottom surface PQ.

FIG. 9 is a perspective in which some of the strips and their plies are shown spaced apart and with the positions of the bands of adhesive 8 and 13 indicated. The material is not seen as in FIG. 9 in practice. When the material is eventually expanded by tension in the expansion direction (T in FIG. 8), the constituent (single-ply) strips remain adhesively secured together and deform to provide a generally-hexagonal-cellular structure.

The cut edges produced by the travelling blade 14 cooperate to produce planar surfaces XY and PQ of generally smooth appearance. On close examination the edge are different in character from edges produced by guillotine cutting. Guillotined edges tend to be more markedly inclined from the perpendicular and to show characteristic deformations produced by the travel of the guillotine blade.

FIG. 10 shows, in plan, part of an edge of the unexpanded material.

The material consists of a series of even pairs E and odd pairs O of strips, of which first-cut edges 751 are shown. The ends of the odd pairs O are evenly displaced by a distance d relative to the odd pairs. Each pair (consisting of course of portions cut one from each web) is joined together by bands of adhesive 752 (from printing roller 7 of FIG. 1), only the bands adjacent to the edges being shown. Joining the pairs are bands of adhesive 753 (from printing roller 12 of FIG. 1) which are staggered relative to the bands 752 to give an expandable structure (see eg. British Specification No. 591,772).

FIG. 10 is drawn out of scale for purposes of explanation. Except as hereinbefore indicated, the material shown in FIG. 10 is conventional material.

No adverse effects on the properties of the honeycomb are found to arise from the displacement of alternate pairs of strips by distance d. It is entirely satisfactory for use as a core material in laminated panels, either after simple expansion to the hexagonal celled stage, or after the compression from that state followed by re-expansion to a stable open-cellular stage as described in commonly assigned U.S. Pat. No. 3,996,087.

The regularly intedented edge of the material in the unexpanded state may be used for metering purposes, for which purpose it may be meshed with a toothed wheel or scanned by an optical transducer operatively connected with suitable counting apparatus.

If the apparatus is provided with pairs of supply rolls additional to rolls 3 and 4 and with a correspondingly increased number of roller printing units like units 7 and 11, to give a total of n supply rolls and n printing units, the strips cut by the blade 14 and pressed into throat 17 are n-ply strips. In the honeycomb obtained, the even pairs E and odd pairs F of strips are replaced by groups containing n strips each with the ends of the odd groups displaced by distance d from the ends of the even group. Material derived from a given supply roll recurs in every nth strip of the product.

Optionally, a perforating roller may be provided to act upon the web 1 and/or the web 2 or upon the two-ply material 9 to form perforations for the venting of vapour when the cellular structure is hot-laminated between facing panels. For purposes of further explanation, such perforations are shown in FIG. 9 for strip 11B only. They are indicated by the reference numeral 28; no connection between these perforations and the shaft 28 of FIG. 3 is intended.

It will be understood that various departures may be made from the specific forms of apparatus described herein without departing from the spirit and scope of the invention.

We claim:

1. Apparatus for cutting web material transversely to form sections of the web material which comprise a blade formed with a linear cutting edge, final advancing means for advancing the web material a section at a time adjacent to the linear cutting edge, final clamping means for clamping the advanced web material in advance of the edge with the sections projecting beyond the edge in turn, a linear guide parallel with the edge, a mounting movable to and fro along the linear guide, a blade carried by the mounting and formed with a circular peripheral cutting edge positioned to overlap the linear cutting edge, in web-material cutting association therewith, and a drive for moving the mounting to and fro along the guide in a continuous cyclic movement in which the mounting is moved in a first direction to a first reversal position, reversed in its motion, moved in the opposite direction to a second reversal position and again reversed in its motion for further movement in said first direction, said final advancing and said final clamping means being operable to advance a section of the web material when the mounting is in the region of its reversal positions and to clamp the web material when the mounting is moving to or fro over an intermediate part of its motion between the reversal positions, said blades cooperating to cut the web material transversely during each intermediate part of the cyclic movement of the mounting to cut off the then projecting section of the web material and leave the remainder of the web material with a cut edge at the positions of the linear cutting edge, said apparatus having, in addition to said final advancing means and said final clamping means, primary advancing means and primary clamping means, said primary and final clamping means, and primary and final advancing means, being arranged to operate so that the primary advancing means advances the web material whilst the final clamping means is clamping it and the primary clamping means clamps the web material whilst the final advancing means is advancing it, the rate of the advancement by the primary advancing means being less than the rate of advancement by the final advancing means.

2. Apparatus according to claim 1 having displacing means for displacing said cut edge from the linear cutting edge across the direction of advancement of the web material said displacing means being mounted to travel with said blade having a circular cutting edge.

3. Apparatus according to claim 2 in which the displacing means is resiliently loaded by resilient means and is arranged to displace the cut edge by a forward movement produced by the resilient means, and to be given a return movement by the clamping means.

4. Apparatus according to claim 1 in which the final advancing means is arranged to be capable of advancing the web material by pulling it through a greater distance than the distance through which it has been advanced by the primary advancing means.

5. Apparatus according to claim 4 in which the final advancing means has rotary members for gripping and advancing the web material, said rotary members being driven by means, adapted by slipping to enable the rotary members to stop rotating when they have advanced the web through the distance through which it has been advanced by the primary advancing means.

6. Apparatus according to claim 5 in which the rotary members are driven by friction clutches.

7. Apparatus according to claim 1 in which the primary advancing means has primary advancing devices in the form of gripping members rotatable in gripping association with the web material.

8. Apparatus according to claim 7 in which the gripping members are crank-driven in an oscillatory manner.

9. Apparatus according to claim 7 in which the gripping members are retractable out of said gripping association and are provided with retracting means for so retracting them during advancement of the web material by the final advancing means.

10. Apparatus according to claim 1 having supply means for supplying the web material thereto in the form of a number n of webs superposed in face to face relationship said number n being at least 2 so that each of said sections is constituted by n plies.

* * * * *